United States Patent [19]

Zahir

[11] Patent Number: 4,767,203

[45] Date of Patent: Aug. 30, 1988

[54] EYEGLASSES AND BINOCULARS COMBINATION

[76] Inventor: Anvar Zahir, 1417 Cabrillp Ave., Burlingame, Calif. 94010

[21] Appl. No.: 945,373

[22] Filed: Dec. 22, 1986

Related U.S. Application Data

[63] Continuation-in-part of Ser. No. 624,258, Jun. 25, 1984.

[51] Int. Cl.⁴ .............................................. G02C 1/00
[52] U.S. Cl. ...................................... 351/158; 351/57
[58] Field of Search ................. 350/146; 351/41, 158, 351/55, 57

[56] References Cited

U.S. PATENT DOCUMENTS

| | | | |
|---|---|---|---|
| 2,024,322 | 12/1935 | Wittig | 351/158 |
| 2,422,661 | 6/1947 | Ellis | 350/146 |
| 2,766,656 | 10/1956 | Better | 350/146 |

*Primary Examiner*—Rodney B. Bovernick
*Assistant Examiner*—P. M. Dzierzynski
*Attorney, Agent, or Firm*—Thomas M. Freiburger

[57] ABSTRACT

An eyeglass/binocular combination wherein the binoculars are mounted on an eyeglass frame. The eyeglass lenses may be made of any material and may be of any thickness. The eyeglass frame has two separate lower openings for the eyeglass lenses and two separate upper openings for vision through the binoculars.

2 Claims, 2 Drawing Sheets

EYEGLASSES AND BINOCULARS COMBINATION

CROSS-REFERENCES TO RELATED APPLICATIONS

This application is a continuation-in-part of my copending application Ser. No. 624,258, filed June 25, 1984.

BACKGROUND OF THE INVENTION

This invention pertains to eyeglasses having telescopic lenses, particularly binoculars which are mounted directly on the eyeglass frame.

Binoculars and hand telescopes are well known in the prior art. However these devices require the user to manually raise them to his eyes and hold them there for viewing. Devices which combine eyeglasses and telescopic lenses are also known in the prior art. U.S. Pat. No. 3,273,456 to Feinbloom discloses a pair of bifocal loupes for use on close up work such as surgery or assembly work with miniature parts. In Feinbloom the lenses of regular eyeglasses are adapted to receive special telemicroscopic lenses. The special lenses are set in the regular eyeglass lenses at their bottom and tilted downwardly.

U.S. Pat. No. 2,389,428 to Glasser also discloses a pair of eyeglasses in which the ordinary lenses are adapted to receive telescopic lenses. The device in Glasser is specifically designed for viewing objects in the distance from the viewer. As in Feinbloom the telescopic lenses are set directly into the ordinary eyeglass lenses.

Several problems are encountered with the Feinbloom and Glasser devices. The connection between the ordinary eyeglass lenses and the telescopic lenses tends to be weak, particularly where the eyeglass lenses are very thin as in non-prescription sunglasses. Thus, the devices tend to be fragile. Also, the thickness of the eyeglass lenses limits the size of telescopic lenses that can be used in the devices. Very thin lenses will not support large telescopic lenses. The telescopic lenses also interfere with vision through the directly adjacent part of the eyeglass lenses. Consequently, not only is the field of vision blocked but part of the field covered by the ordinary lenses is wasted.

U.S. Pat. No. 2,024,322 to Wittig discloses goggles which are fitted with telescopic lenses. In Wittig the telescopic lenses extend downwardly from the goggle frame into the non-prescription goggle lenses causing the goggle lenses to be irregularly shaped and also blocking the wearer's field of vision.

SUMMARY OF THE INVENTION

In accordance with this invention eyeglasses are fitted with telescopic lenses or binoculars. The binoculars are attached to the frame of the eyeglasses rather than to the eyeglass lenses themselves. The eyeglass lenses may be prescription lenses or tinted lenses and they may be made of any material since the telescopic lenses do not rely on the eyeglass lenses for support. The size of the binoculars is not limited by the type of lenses in the eyeglasses. Also the telescopic lenses of the binoculars do not extend into the eyeglass lenses causing their shape to be irregular. The binoculars are used simply by the wearer tilting his head forward slightly until the object to be viewed comes into the range of the binoculars.

It is generally an object of this invention to provide an eyeglass/telescopic lens combination. Another object of this invention is to provide eyeglass frames which are fitted with binoculars as well as prescription, photochromic or ordinary sunglass lenses.

DESCRIPTION OF THE PREFERRED EMBODIMENT

Figure 1:
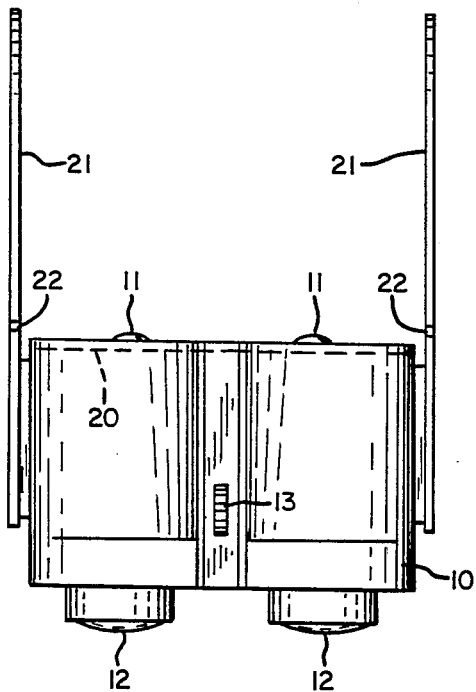
FIG. 1 is a top plan view of one embodiment of the eyeglass/binoculars.
Figure 2:
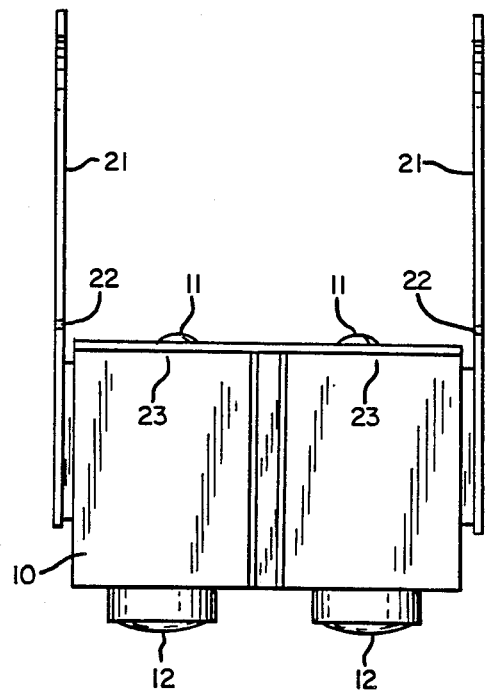
FIG. 2 is a bottom plan view of the eyeglass/binoculars.
Figure 3:
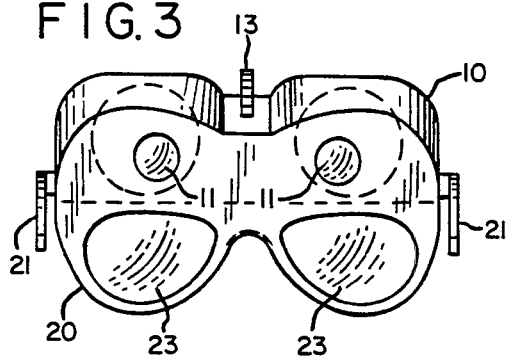
FIG. 3 is a rear elevation view of the eyeglass-/binoculars
Figure 4:
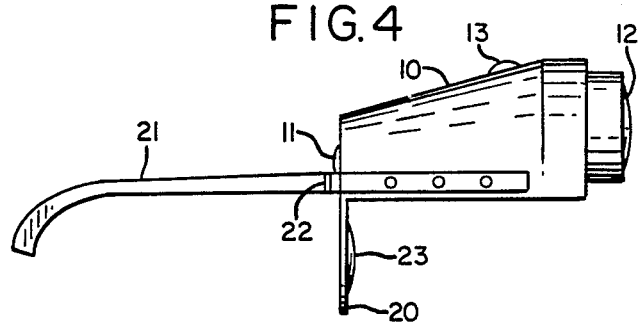
FIG. 4 is a left elevation view of the eyeglass/binoculars.
Figure 5:
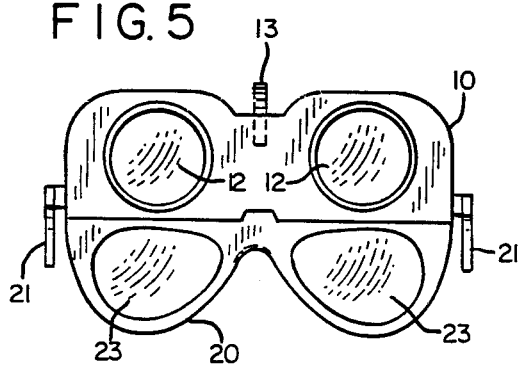
FIG. 5 is a front elevation view of the eyeglass-/binoculars.
Figure 6:
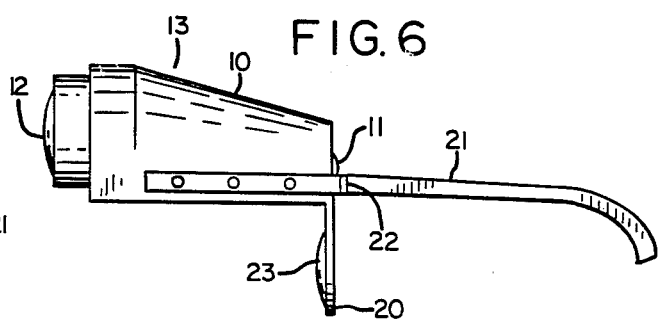
FIG. 6 is a right elevation view of the eyeglass-/binoculars.
Figure 7:
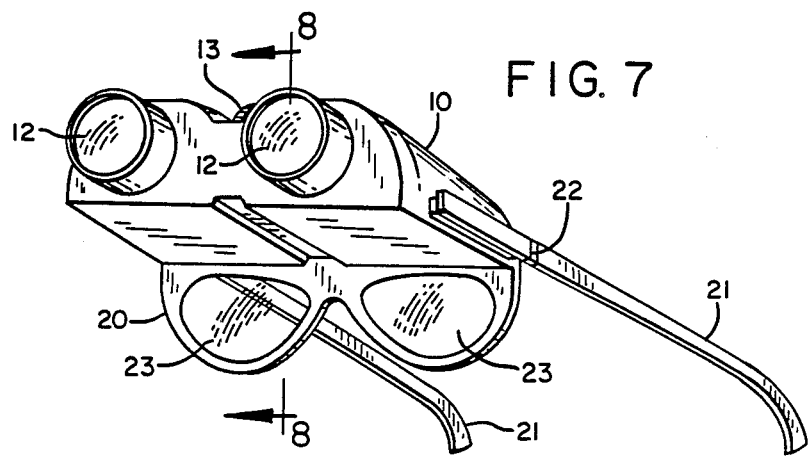
FIG. 7 is a perspective view of the eyeglass/binoculars.
Figure 8:
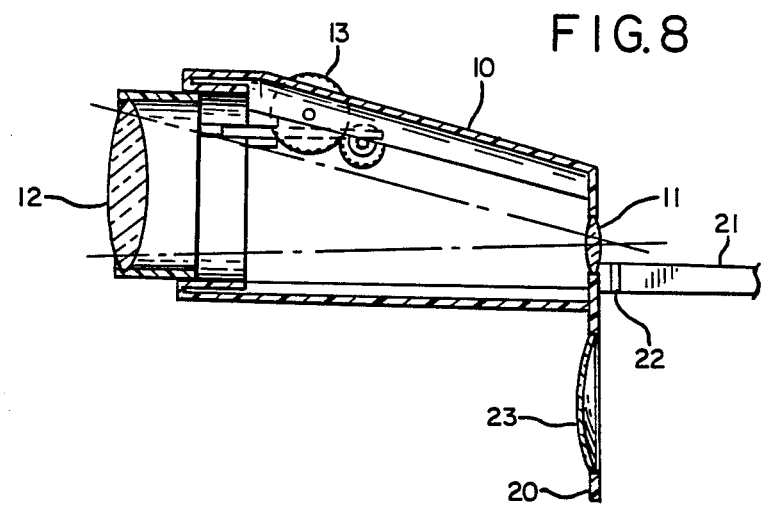
FIG. 8 is a section view taken along line 8—8 in FIG. 7.

Referring to the drawings, binoculars or telescopic lenses 10 are attached to or are integrally formed with the eyeglass frame 20 which also holds eyeglass lenses 23. The frame contains two lower openings for receiving the eyeglass lenses and two upper openings for vision through the binoculars. The binoculars have eyepieces 11 and objectives 12, the objectives being adjustably mounted for movement with respect to the eyepieces for focusing. The objectives are adjusted by an adjustment means 13 mounted on the binoculars. The eyeglass lenses may be made of any lens material and may also be of any thickness. The eyeglass/binocular combination is also fitted with temple pieces 21 as with ordinary eyeglasses. Hinges 22 allow the temple pieces to be folded inward for storage.

Although a specific embodiment of the invention has been described, it will be understood that this is only for purposes of illustration and that many variations can be made in the structure shown without departing from the spirit of this invention.

I claim:

1. An eyeglass/binocular combination for normal viewing and for viewing distant objects which can be worn as a regular pair of eyeglasses, comprising:
   an eyeglass frame,
   adjustable focusable telescopic binoculars mounted at an upper position on the eyeglass frame, and
   two corrective eyeglass lenses mounted in frame openings at a lower position on the eyeglass frame, the eyeglass frame containing a total of four separate openings, two for the eyeglass lenses and two for vision through the binoculars, so that the binoculars may be used by the wearer tipping his head forward while keeping his eyes directed to the object to be viewed, and wherein the direct field of vision through the corrective eyeglass lenses is unobstructed by the binoculars.

2. An eyeglass/binocular combination as in claim 1 wherein the binoculars are integrally formed with the eyeglass frame.

* * * * *